United States Patent [19]

Butler

[11] Patent Number: 5,110,890
[45] Date of Patent: May 5, 1992

[54] METHOD OF MAKING ORGANISILOXANE RESINS

[75] Inventor: Derek W. Butler, South Glamorgan, United Kingdom

[73] Assignee: Dow Corning Limited, Barry, Wales

[21] Appl. No.: 483,524

[22] Filed: Feb. 22, 1990

[30] Foreign Application Priority Data

Mar. 22, 1989 [GB] United Kingdom ............... 8906626

[51] Int. Cl.$^5$ ............................................. C08G 77/06
[52] U.S. Cl. .......................................... 528/12; 528/20; 528/34; 528/30; 528/39; 556/450
[58] Field of Search ............. 528/12, 20, 34, 39, 528/30; 556/450

[56] References Cited

U.S. PATENT DOCUMENTS

| | | | |
|---|---|---|---|
| 3,036,985 | 6/1962 | Daudt | 260/42 |
| 3,772,247 | 3/1973 | Flannigan | 260/465 H |
| 4,374,933 | 2/1983 | Scholze et al. | 528/12 |
| 4,485,130 | 11/1984 | Lampin et al. | 528/12 |

FOREIGN PATENT DOCUMENTS 706719 4/1954 United Kingdom .
1359024 11/1974 United Kingdom .

*Primary Examiner*—Melvyn I. Marquis
*Attorney, Agent, or Firm*—Roger H. Borrousch

[57] ABSTRACT

Liquid organosiloxane MTQ resins of the general formula $[M_xT_yQ_z]_n$ wherein M denotes a monofunctional, T a trifunctional and Q a tetrafunctional siloxane unit, n has an average value of from 4 to 14, x+y is not less than z and not more than 2 z and x/y has a value of from 2 to 9 are prepared by a method comprising (I) adding together (A) a silane of the general formula $SiZ_4$, (B) a silane of the general formula $RSiY_3$ and (C) a silane of the formula $R_3SiX$ or (C') a disiloxane of the formula $(R_3Si)_2O$ in an acidic aqueous medium and (II) allowing Components (A), (B) and (C) or (C') to react together. X denotes a halogen or alkoxy group, Y denotes X or $-OSiR'_3$, Z denotes an alkoxy group and Component (A) is not added to the aqueous medium prior to Components (B) and (C) or (C').

10 Claims, No Drawings

METHOD OF MAKING ORGANISILOXANE RESINS

This invention relates to a method of making organosiloxane resins, particularly resins having mono-, tri- and tetrafunctional siloxane units (hereinafter referred to as MTQ resins).

Organosiloxane resins having mono-, tri- and tetratetrafunctional siloxane units are known and have been described for example in British Patent Specifications 706 719, 783 867 and 1 359 024. The functionality of the siloxane groups refers to the number of silicon bonds which are formed or formable through silicon-oxygen bonds. In the first of these specifications the siloxane resins are prepared by reacting one or more silanes and/or one or more siloxanes with a silica hydrosol. Most of these resins are solid, but some of the resulting materials described are liquid copolymers. In the second of these specifications the resins are described as finely divided solid organosilicon compounds, which are used as fillers for optically clear organopolysiloxane elastomer compositions. They are manufactured by preparing a silica co-hydrogel from e.g. sodium silicate and a monoorganosiloxane salt, and reacting the co-hydrogel with a siloxane in an acidic medium. The last of the specification mentioned above provides profoamers which are copolymers having mono-, tri- and tetrafunctional units. Preparation methods described include cohydrolysis of a mixture of $R_3SiX$, $RSiX_3$ and $SiX_4$ wherein R is alkyl, aryl, alkaryl or aralkyl and X is a hydrolysable group, halogen being the only one disclosed; addition of a blend of $R_3SiX$ and $RSiX_3$ to a stabilised hydrosol; and the addition of a solution of $R_3SiX$ to a stabilised hydrosol of silica and methylsiliconic acid. In U.S. Pat. No. 3 772 247 organopolysiloxane resins which include MTQ resins are described e.g. in Examples 4, 5 and 6. The method of making the resins of the Examples is the same as the method described in GB. 706 719. U.S. Pat. No. 3 772 247, however, mentions as alternative methods the cohydrolysis as described in G.B. 1 359 024 and the hydrolysis of a solvent solution of a triorganoalkoxysilane, a trialkoxysilane and a tetraalkoxysilane. The latter two methods are not exemplified but the MTQ resins produced in the examples are all stated to be brittle solids. The methods described in the prior art make it difficult to control the molecular weight of the resins and the products tend to be composed of a mixture of resins with a wide range of molecular weight, mostly resulting in solid resin materials. A reproducible method for producing well defined MTQ resins or a consistent method for producing liquid MTQ resins has not been disclosed.

We have now found that organosiloxane MTQ resins, which are liquid at or below 50° C. and have a relatively narrow molecular weight range can be prepared by reacting together tetrafunctional alkoxysilanes and trifunctional silanes with monofunctional silanes or with disiloxanes in an acidic aqueous medium.

According to the present invention there is provided a method for making organosiloxane resins which are liquid at 50° C. at a pressure of $10^5$ Pa and have the general formula $[M_xT_yQ_z]_n$, wherein M denotes a monofunctional siloxane unit of the formula $R_3SiO_{\frac{1}{2}}$, T denotes a trifunctional siloxane unit of the general formula $RSiO_{3/2}$ and Q denotes a tetrafunctional unit of the general formula $SiO_{4/2}$, wherein R represents an aliphatic or aromatic hydrocarbon substituent, hydrogen, a substituted hydrohydrocarbon or an organic substituent linked to silicon via a carbon atom and having O and/or P or S atoms present, n has an average value of from 4 to 14 and x, y and z have values such that $x+y$ is not less than z and not more than 2z and that the ratio of x to y has a value of from 2 to 9, which comprises (I) adding together z molar parts of (A) a silane of the general formula $SiZ_4$ and y molar parts of (B) a silane of the general formula $RSiY_3$ and either x molar parts of (C) a silane of the formula $R_3SiX$ or x/2 molar parts of (C') a disiloxane of the formula $(R_3Si)_2O$ in an aqueous medium, wherein X denotes a halogen or alkoxy group, Y denotes X or a group of the general formula $-OSiR'_3$ wherein R' denotes an alkyl group or an aryl group and Z denotes an alkoxy group provided that Component (A) is not added to the aqueous medium prior to Components (B) and (C) or (C') and (II) allowing Components (A), (B) and (C) or (C') to react together in said aqueous medium, the medium having a pH below 7.

In the method of the invention there is used as Component (A) a silane of the formula $SiZ_4$, wherein each Z independently denotes an alkoxy group, preferably a lower alkoxy group, most preferably having 2 to 4 carbon atoms, e.g. ethoxy and n-propoxy groups. These silanes, also called orthosilicates are well known in the art and are commercially available materials. Preferred Components (A) include tetraethylorthosilicate (tetraethoxysilane), n-propylorthosilicate (tetrapropoxysilane) and tetrabutylorthosilicate (tetrabutoxysilane).

Component (B) is a trifunctional silane having three Y groups linked to the silicon atom and one group R. R is selected from the group consisting of aliphatic and aromatic hydrocarbon substituents, a hydrogen atom, chloropropyl, trifluoropropyl, organic groups linked to silicon via a carbon atom and having oxygen present, organic groups linked to silicon via a carbon atom and having oxygen and phosphorous present, organic groups linked to silicon via a carbon atom having oxygen and sulphur present, and organic groups linked to silicon via a carbon atom and having sulphur present. R is selected from the group including hydrogen, a hydrocarbon group which is either aliphatic, aromatic, olefinically unsaturated or acetylenically unsaturated, for example alkyl, e.g. methyl, ethyl and isobutyl, aryl, e.g. phenyl, alkaryl, e.g. tolyl, aralkyl, e.g. phenylethyl, alkenyl, e.g. vinyl, allyl and hexenyl, styryl, benzyl, alkynyl, e.g. ethynyl and propargyl and substituted hydrocarbon, e.g. chloropropyl and trifluoropropyl. R may also be an organic substituent linked to silicon via a carbon atom and having O, S or P atoms in the substituent, e.g. those having ≡COH groups present, e.g. $-(CH_2)_3OH$, $(CH_2)_2(OCH_2CH_2)_8OH$ and $-CH_2-C(CH_3)-CH_2OH$, those having acrylic groups present, e.g. methacryloxypropyl and acryloxypropyl, those having aldehyde, ketone or acid groups present, those having thio groups present, e.g. mercaptopropyl, those with sulfonic acid groups present and those with phosphonic acid groups present. Preferred are those compounds where R is hydrogen, a lower alkyl, alkenyl or substituted alkyl group or an organic group having an acrylic or thio group present. The group Y in Component (B) is alkoxy, preferably methoxy or ethoxy, a halogen, preferably a chlorine atom or a group of the formula $-OSiR'_3$, wherein R' is as defined above, preferably a methyl group. Examples of Component (B) therefore include methyltrimethoxy silane, triethoxysilane, vinyltrichloro silane, phenyltrimethoxy silane, allyltriethoxy silane, methacryloxypropyl trichloro silane, mercaptopropyl triethoxy silane, Y-chloropropyl trimethoxy silane, trifluoropropyl trichloro silane and vinyltris (trimethylsiloxy) silane.

Components (C) and (C') for use in the method of the invention are respectively monofunctional silanes and disiloxanes. The silicon-bonded substituents R may be any of the groups described above. It is, however, preferred that all R groups in Components (C) or (C') are saturated aliphatic hydrocarbon groups or aromatic hydrocarbon groups. Preferably all R groups are lower alkyl groups, most preferably methyl groups. X may be an alkoxy group or a halogen group, preferably methoxy, ethoxy or chlorine. Examples of materials which may be used as Component (C) are trimethylchlorosilane, triphenylchlorosilane, phenyldimethylchlorosilane, trimethylmethoxysilane, dimethylchlorosilane and glycidoxypropyldimethylmethoxysilane. It is, however, preferred to use Component (C') which is most preferably hexamethyldisiloxane.

The method of the invention is carried out in an aqueous medium, which has a pH below 7. The medium may either be made acidic by the addition of an acid, preferably a Broensted acid, or it may be made acidic due to the hydrolysis of some of the components used in the method of the invention. The latter will happen e.g. if Y and/or X in Components (B) and (C) are chlorine. In the presence of water, these components will hydrolyse and form HCl in the medium. If X in Component (C) and Y in Component (B) is e.g. a chlorine atom, no acidification of the medium may be required. Even if X in Component (C) would be e.g. a methoxy group sufficient acidification may take place by adding component (B) if Y is a chlorine atom. However, additional acid is preferably added. When Component (C') is used, it is important to acidify the medium with an acid. If X and Y are both chlorine atoms, it is possible to add Component (A) at the same time as (B) and (C) to the reaction mixture.

In stage (I) of the method of the invention, it is important that Component (A) is not added to the aqueous medium before Components (B), (C) or (C'). Component (A) may be added simultaneously with, or subsequently to, either or both of Components (B) and (C) or (C'). It is preferred to disperse the Component (C) or (C') in the aqueous medium, before a mixture of Components (A) and (B) is gradually added. This method encourages the formation of the resins of the invention in such way that they have the correct structure to be liquid. However, Component (B) may be added to the dispersion of Component (C) or (C') prior to the addition of Component (A). The addition of Component (A) prior to either or both of Components (B) and (C) or (C') would result in a resin which has a structure which favours the formation of solids. Unless both X and Y are halogent atoms it is preferred to add Component (A) subsequently to the addition of either or both of Components (B) and (C) or (C').

The reaction in stage (II) of the method of the invention between Components (A), (B) and (C) or (C') occurs as a result of the hydrolysis of the components and the subsequent condensation of the thus formed silanol groups in the acidic medium according to the known reaction

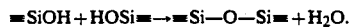

However, in view of the presence of Component (A) which upon hydrolysis forms a highly reactive compound of the formula Si(OH)$_4$, it is recommended to add an alcohol in order to reduce the hydrolysis rate of Component (A), thus reducing the danger of premature condensation of the components and the possible formation of gel particles. Suitable alcohols for this purpose include ethanol and isopropanol, the choice of alcohol being preferably the corresponding alcohol of the alkoxy group present as substituent Z i.e. an alcohol of the formula ZH. Preferably ethanol is used in combination with as Component (A) tetraethoxysilane. The reaction between the components is preferably accelerated by reacting them at an elevated temperature, preferably around the reflux temperature of the dispersion, e.g. 50 to 75° C.

In order to ensure the production of resins which are liquid at 50° C. under atmospheric pressure, it is important to use the correct proportions of the different components, as the liquid state arises from the above specified proportions of the different siloxane units. It is believed that the liquid state is determined at least to some extent by the structure of the resin molecules. The applicant believes, but does not wich to be bound by this, that the structure of the resins of this invention is based on a core of Q units, which is surrounded by M and T units, thus differing from a more open structure of solid MTQ resins. The exact molecular weight is determined by the desired proportions of the siloxane units of the resin. With the expression "molar part" as used herein is meant that the components are added in such amount that their molar ratio equals the ratio of the number of M, T and Q units present in the organosiloxane MTQ resin molecule. In other words adding z molar parts of (A), y molar parts of (B) and x molar parts of (C) means that the molar ratio of (A)/(B)/(C) in the amounts added is equal to the ratio of z/y/x. The value of x+y has to be not less than z and not more than 2z. Resins wherein the value of x+y is lower than z are solid materials, often having an open structure and having a largely superior molecular weight than the resins made by the method of this invention. Resins with a value of x+y which is higher than 2z tend to be materials whith a very low molecular weight, and are believed to yield resins which do not have the desired structure. The ratio of x/y has a value of from 2/1 to 9/1. Preferably this ratio is in the range 3/1 to 5/1. The average value of n is from about 4 to about 14. Values below about 4 are usually only obtained when resins are produced wherein the x+y is larger than 2z, while values above about 14 yield solid resins.

Making resins by the method of the invention allows one to make them in a very reproducible way and to obtain resins which have a comparatively narrow range of molecular weight. This was not possible using methods of the prior art.

Resins which are made by the method of the invention are liquid resins which are very useful as fillers in elastomer forming compositions, as coating materials providing a plastic coating or as precursors for further reaction with other compounds. For example a resin in which a has a value of 0 and in which R' is a hydrogen atom, may be further reacted with a compound having olefinic unsaturation in the presence of a catalyst which catalyses hydrosilylation. Thus resins may be obtained having different groups present, which could not be produced directly due to their instability in the acidic reaction medium. Such resins include resins having amino groups present.

There now follow a number of examples which illustrate the invention, in which Me denotes a methyl group, Ph a phenyl group and Vi a vinyl group and in which all parts and percentages are expressed by weight unless otherwise stated.

EXAMPLE 1

To a flask fitted with agitator and condenser 40g of concentrated hydrochloric acid were charged together with 30g of ethanol (95% v/v) and 60g of distilled water. The flask was kept under a nitrogen blanket and 113.4g (0.7 mole) of hexamethyldisiloxane was added. The mixture was heated to 50° C. for 20 minutes, at which time a mixture of 208.4g (1 mole) of tetraethoxysilane and 104.6g (0.4 mole) of methacryloxypropyl trichlorosilane was added slowly over a period of 90 minutes. During the addition the temperature in the mixture rose to 68° C. When all the ingredients were added, the mixture was maintained between 64 to 69° C. for an extra hour. The organosiloxane resin was separated when the mixture was cooled. It was washed with distilled water and dried over $MgSO_4$. After filtration the mixture was stripped of volatile components at 100° C. and a pressure of 2 mbar. A pale straw coloured liquor was obtained, which had a viscosity at 25° C. of 1059.7 $mm^2/s$. When repeating the procedure twice, materials having a viscosity of 1091 and 714.9 $mm^2/s$ were obtained respectively.

EXAMPLE 2

To a flask fitted with agitator and condenser 20g of concentrated hydrochloric acid were charged together with 15g of ethanol (95% v/v) and 30g of distilled water. The flask was kept under a nitrogen blanket and 64.8g (0.4 mole) of hexamethyldisiloxane was added. The mixture was heated to 75° C. at which point a gentle reflux was observed. At this time a mixture of 104.2g (0.5 mole) of tetraethoxysilane and 31.2g (0.2 mole) of vinyltrichlorosilane was added slowly over a period of about 180 minutes. During the addition the temperature in the mixture rose to 85° C. When all the ingredients were added, the mixture was maintained at 85° C. for an extra two hours. The organosiloxane resin was separated when the mixture was cooled. It was washed with distilled water and then extracted with toluene. After another washing in distilled water, the resin containing phase was dried over $NaHCO_3$/$MgSO_4$. After filtration the mixture was stripped of volatile components at 130° C. and a pressure of 20 mbar. A water white liquor was obtained, which had a viscosity at 25° C. of 326.2 $mm^2/s$. When repeating the procedure material having a viscosity of 292.7 $mm^2/s$ and 404.7 $mm^2/s$ were obtained. The Vi content was respectively 4.7, 4.8 and 4.6%.

EXAMPLE 3

The procedure of example 2 was repeated four times, except for the fact that no HCl was added. Materials with a viscosity of 175.7, 175.9, 155 and 148.7 $mm^2/s$ respectively were obtained, having a respective vinyl content of 5.38, 5.29, 5.41 and 5.37%.

EXAMPLE 4

The procedure of Example 2 was repeated twice, except that $ViSiCl_3$ was replaced by $ViSi(OCH_2CH_3)_3$, which was added over a period of 2 hours. The resulting resing had a viscosity of 1077 and 901.8 $mm^2/s$ and a vinyl content of 4 54 and 4.56% respectively.

EXAMPLE 5

The procedure of Example 2 was repeated 3 times, except that the amount of hexamethyldisiloxane was reduced to three quarters and the $ViSiCl_3$ was replaced by $ViSi(OSiMe_3)_3$. The resin obtained had a viscosity of 97, 114.8 and 104.4 $mm^2/s$ respectively and a vinyl content of 3.79, 3.73 and 3.71% respectively.

EXAMPLE 6

To a flask fitted with agitator and condenser 120g of concentrated hydrochloric acid were charged together with 90g of ethanol (95% v/v) and 180g of distilled water. The flask was kept under a nitrogen blanket and 340.2g (2.1 mole) of hexamethyldisiloxane was added. The mixture was heated to 70° C. over 35 minutes, at which time a mixture of 624.9g (3 mole) of tetraethoxysilane and 237.6g (1.2 mole) of phenyl trimethoxysilane was added slowly over a period of 175 minutes. During the addition the temperature in the mixture rose to 76° C., which was maintained for two hours. The organosiloxane resin was separated when the mixture was cooled. It was washed with distilled water and dried over $MgSO_4$. After filtration the mixture was stripped of volatile components at 130° C. and a pressure of 24 mbar. A water white viscous liquor was obtained (88.4% yield), which had a viscosity at 25° C. of 7580 $mm^2/s$ and a molecular weight of 954.87. When repeating the procedure, a material having a viscosity of 7363 $mm^2/s$ and a molecular weight of 940.38 was obtained.

EXAMPLE 7

To a flask fitted with agitator and condenser 120g of concentrated hydrochloric acid were charged together with 90g of ethanol (95% v/v) and 180g of distilled water. The flask was kept under a nitrogen blanket and 340.2g (2.1 mole) of hexamethyldisiloxane was added. The mixture was heated to 70° C. over 35 minutes, at which time a mixture of 624.9g (3 mole) of tetraethoxysilane and 199.8g (1.2 mole) of γ-chloropropyl trimethoxysilane was added slowly over a period of 140 minutes. During the addition the temperature in the mixture rose to 76° C., which was maintained for two hours. The organosiloxane resin was separated when the mixture was cooled. It was washed with distilled water and dried over $MgSO_4$. After filtration the mixture was stripped of volatile components at 130° C. and a pressure of 24 mbar. 579.1g (85.7% yield) of a resin was obtained, which had a viscosity at 25° C. of 2525.4 $mm^2/s$ and a mole-molecular weight of 995.4. When repeating the procedure twice, materials having a viscosity of 2619 and 1553 $mm^2/s$ and a molecular weight of 949.49 and 954.77 respectively were obtained.

EXAMPLE 8

To a flask fitted with agitator and condenser 20g of concentrated hydrochloric acid were charged together with 15g of ethanol (95% v/v) and 30g of distilled water. The flask was kept under a nitrogen blanket and 64.8g (0.4 mole) of hexamethyldisiloxane was added. To the mixture was added at a temperature of 15° C. a mixture of 104.2g (0.5 mole) of tetraethoxysilane and 27.1g (0.2 mole) of $HSiCl_3$ was added slowly over a period of 165 minutes. During the addition the temperature in the mixture rose to 30° C. The organosiloxane resin was separated, washed with distilled water and dried over $MgSO_4$. After filtration the mixture was stripped of volatile components at 100° C. and a pressure of 2 mbar. A viscous liquor was obtained, which had a viscosity at 25° C. of 1802.3 mm$^2$/s and a SiH content of 2.59%.

That which is claimed is:

1. A method of making organosiloxane resins which are liquid at 50° C. at a pressure of 10$^5$ Pa and have the general formula [M$_x$T$_y$Q$_z$]$_n$, wherein M denotes a monofunctional siloxane unit of the formula R$_3$SiO$_{\frac{1}{2}}$, T denotes a trifunctional siloxane unit of the general formula RSiO$_{3/2}$ and Q denotes a tetrafunctional unit of the general formula SiO$_{4/2}$, wherein R is selected from the group consisting of aliphatic and aromatic hydrocarbon substituents, a hydrogen atom, chloropropyl, trifluoropropyl, organic groups linked to silicon via a carbon atom and having oxygen present, organic groups linked to silicon via a carbon atom and having oxygen and phosphorous present, organic groups linked to silicon via a carbon atom and having oxygen and sulphur present and organic groups linked to silicon via a carbon atom and having sulphur present, n has an average value of from 4 to 14 and x, y and z have values such that x+y is not less than z and not more than 2z and that the ratio of x to y has a value of from 2 to 9, which comprises (I) adding together z molar parts of (A) a silane of the general formula SiZ$_4$, molar parts of (B) a silane of the general formula RSiY$_3$ and either x molar parts of (C) a silane of the formula R$_3$SiX or x/2 molar parts of (C') a disiloxane of the formula (R$_3$Si)$_2$O in an aqueous medium, wherein X is selected from the group consisting of halogen atoms and alkoxy groups, Y is selected from the group consisting of halogen atoms, alkoxy groups and groups of the general formula —O—SiR'$_3$, wherein R' is selected from the group consisting of alkyl and aryl groups and Z denotes an alkoxy group provided that Component (A) is not added to the aqueous medium prior to Components (B) and (C) or (C'), and (II) allowing Components (A), (B) and (C) or (C') to react together in said aqueous medium, the medium having a pH below 7.

2. A method according to claim 1 wherein Component (C) or (C') is dispersed in the aqueous medium before Components (A) and (B) are added.

3. A method according to claim 1 wherein an alcohol is also added to the aqueous medium.

4. A method according to claim 3 wherein the alcohol has the formula ZH wherein Z is the same alkoxy group as used in Component (A).

5. A method according to claim 1 wherein the ratio of x/y is from 3/1 to 5/1.

6. A method according to claim 1 wherein Z in Component (A) is an alkoxy group with 2 to 4 carbon atoms.

7. A method according to claim 1 wherein in Component (B) R is selected from the group consisting of hydrogen, lower alkyl, alkenyl, acrylic-functional and thiofunctional organic groups and wherein Y is selected from a chlorine atom, a methoxy group, an ethoxy group and a trimethylsiloxy group.

8. A method according to claim 1 wherein in Component (C) each R group is selected from the group consisting of saturated aliphatic hydrocarbon groups and aromatic hydrocarbon groups.

9. A method according to claim 1 wherein each R in Component (C) is a methyl group.

10. A method according to claim 1 wherein (C') is used and each R therein denotes a methyl group.

* * * * *